United States Patent
Meguro et al.

(10) Patent No.: US 6,778,363 B2
(45) Date of Patent: Aug. 17, 2004

(54) MAGNETORESISTIVE HEAD HAVING LONGITUDINAL BIASING BY PROVIDING UNDIRECTIONAL MAGNETIC ANISOTROPY

(75) Inventors: Kenichi Meguro, Matsuda (JP); Hisashi Kimura, Odawara (JP); Katsuro Watanabe, Odawara (JP)

(73) Assignee: Hitachi Global Storage Technologies Japan, Ltd., Kanagawa-ken (JP)

( * ) Notice: Subject to any disclaimer, the term of this patent is extended or adjusted under 35 U.S.C. 154(b) by 0 days.

(21) Appl. No.: 10/075,286

(22) Filed: Feb. 15, 2002

(65) Prior Publication Data

US 2003/0206383 A1 Nov. 6, 2003

(30) Foreign Application Priority Data

Aug. 28, 2001 (JP) ........................ 2001-257265

(51) Int. Cl.$^7$ ................................ G11B 5/39
(52) U.S. Cl. ............... 360/324.11; 360/324.12; 360/324.2
(58) Field of Search .............. 360/321, 324.1, 360/324.12, 324.2

(56) References Cited

U.S. PATENT DOCUMENTS

| | | | | |
|---|---|---|---|---|
| 6,452,385 B1 | * | 9/2002 | Shimazawa et al. | ........ 324/252 |
| 6,466,419 B1 | * | 10/2002 | Mao | ........................ 360/324.12 |
| 6,501,626 B1 | * | 12/2002 | Gill | ........................ 360/324.11 |
| 6,556,391 B1 | * | 4/2003 | Aoshima et al. | ........ 360/324.12 |
| 6,556,392 B1 | * | 4/2003 | Mao et al. | ............. 360/324.12 |
| 2001/0014001 A1 | * | 8/2001 | Aoshima et al. | ........ 360/327.32 |
| 2003/0042903 A1 | * | 3/2003 | Hasegawa et al. | .......... 324/252 |

FOREIGN PATENT DOCUMENTS

| | | |
|---|---|---|
| JP | 4-358310 | 12/1992 |
| JP | 7-57223 | 3/1995 |
| JP | 2000-173020 | 6/2000 |

* cited by examiner

*Primary Examiner*—Jefferson Evans
(74) *Attorney, Agent, or Firm*—Mattingly, Stanger & Malur, P.C.

(57) ABSTRACT

There is provided a magnetoresistive head which can realize high sensitivity and low noise even when the reading track is being reduced. Longitudinal biasing is performed to a ferromagnetic free layer whose magnetization is rotated according to an external magnetic field by providing unidirectional magnetic anisotropy by exchange coupling to an antiferromagnetic layer. A hard magnetic film is arranged at the edge of a magnetoresistive film to reduce an effective reading track width.

17 Claims, 8 Drawing Sheets

- (1) HARD BIASING STRUCTURE
- (2) THIS INVENTION STRUCTURE : $\gamma 2$
- (3) THIS INVENTION STRUCTURE : $\gamma 4$
- (4) THIS INVENTION STRUCTURE : $\gamma 6$
- (5) THIS INVENTION STRUCTURE : $\gamma 8$

FIG.9

MAGNETORESISTIVE HEAD HAVING LONGITUDINAL BIASING BY PROVIDING UNDIRECTIONAL MAGNETIC ANISOTROPY

BACKGROUND OF THE INVENTION

1. Field of the Invention

The present invention relates to a magnetoresistive head which reads information written onto a magnetic recording medium, and more specifically to a magnetoresistive head of a novel longitudinal biasing method of a ferromagnetic layer for detecting a signal field and the fabricating method.

2. Description of the Related Art

In a magnetoresistive head mounted as a reading element on a magnetic recording and reading device, a GMR (Giant Magnetoresistive) head using a spin valve film having a basic structure of ferromagnetic free layer/nonmagnetic conductive layer/ferromagnetic film fixing layer/antiferromagnetic layer described in Japanese Published Unexamined Patent Application No. Hei 4-358310 is widely used at present. In the magnetoresistive head, in order to inhibit Barkhausen noise, longitudinal biasing must be performed to a ferromagnetic free layer whose magnetization direction is changed by a signal field. As the longitudinal biasing method, Japanese Published Unexamined Patent Application No. Hei 7-57223 describes a method in which a hard magnetic film or a deposited film of a ferromagnetic film and an antiferromagnetic film is arranged at each edge of a magnetoresistive film to set a ferromagnetic free layer on single domain state. The former is called a hard biasing structure which is the mainstream of the current head structure.

The hard biasing structure applies a longitudinal biasing field to a ferromagnetic free layer and is effective for inhibiting Barkhausen noise. On the other hand, it is widely known that magnetization at the edge of an element is fixed to form the so-called insensitive zone. Since the magnetization direction in the insensitive zone is not changed by a signal field, formation of the insensitive zone substantially reduces the reading sensitivity. With the future increase of the surface recording density of a magnetic recording and reading device, the track width is being reduced to increase the occupying percentage of the insensitive zone. This problem is expected to be significant.

To reduce formation of the insensitive zone for the purpose of ensuring the reading sensitivity, the film thickness of a hard magnetic film is decreased to reduce a longitudinal biasing field applied to the ferromagnetic free layer. The effect for inhibiting Barkhausen noise is insufficient. This means that inhibition of Barkhausen noise and reduction of insensitive zone formation are in a trade-off relation As another means for performing longitudinal biasing to a ferromagnetic free layer, Japanese Published Unexamined Patent Application No. 2000-173020 describes a longitudinal biasing structure by interface exchange coupling. Since this structure exchange couples the entire surface of a ferromagnetic free layer to an antiferromagnetic layer, it has a reliable and uniform longitudinal biasing effect. In the hard biasing structure previously described, the geometrical arrangement relation between a hard magnetic film and a ferromagnetic free layer and the shape of an element by patterning affect the magnitude of the longitudinal biasing field. On the contrary, in the longitudinal biasing structure by interface exchange coupling, antiferromagnetic material and its film thickness are selected and a suitable exchange coupling field biasing layer is interposed between a ferromagnetic free layer and an antiferromagnetic layer. An advantage of easily adjusting a longitudinal biasing field can be expected. Since a magnetic pole is caused at the edge of the ferromagnetic free layer, magnetization of the edge is expected to be unstable. A sufficient longitudinal biasing effect cannot be obtained. The influence of this is expected to be significant as the geometrical track width is being reduced.

SUMMARY OF THE INVENTION

In consideration of the future increase of the surface recording density of a magnetic recording and reading device, as described above, it can be expected that it is difficult to realize both inhibition of Barkhausen noise and ensuring of the reading sensitivity in the hard biasing structure, and reduction of the reading track width in the longitudinal biasing structure by interface exchange coupling. The prior art longitudinal biasing means cannot obtain reading characteristic which can correspond to the future magnetic recording and reading device with a high recording density and imposes an important problem of establishment of novel longitudinal biasing means. This is not limited to the current CIP (Current in the plane)—GMR head, but is a common problem for a CPP (Current perpendicular to the plane)—GMR head and a TMR (Tunneling Magnetoresistive) head which are expected to be practical as the next generation head.

Accordingly, an object of the present invention is to provide a magnetoresistive head which applies longitudinal biasing means satisfying all of inhibition of Barkhausen noise, high reading sensitivity, and reduction of an effective reading track width and the fabricating method.

To achieve the foregoing object, in the present invention, a magnetoresistive head having a first and a second ferromagnetic layers separated by a nonmagnetic conductive layer or a nonmagnetic tunneling barrier layer; a magnetoresistive film in which the magnetization direction of the first ferromagnetic layer is fixed by a first antiferromagnetic layer provided to be contacted with the first ferromagnetic layer opposite to the nonmagnetic conductive layer or the nonmagnetic tunneling barrier layer; and a pair of electrodes for flowing a sense current to the magnetoresistive film, includes: a second antiferromagnetic layer arranged so as to provide unidirectional magnetic anisotropy to the second ferromagnetic layer; and a hard magnetic film arranged so as to apply a magnetic field to the second ferromagnetic layer.

In the present invention, a second antiferromagnetic layer is formed to be contacted with the second ferromagnetic layer opposite to the nonmagnetic conductive layer or the nonmagnetic tunneling barrier layer, and a hard magnetic film is formed at each edge of the magnetoresistive film in the track width direction.

In the present invention, a magnetoresistive head having a first and a second ferromagnetic layers separated by a nonmagnetic conductive layer or a nonmagnetic tunneling barrier layer; a magnetoresistive film in which the magnetization direction of the first ferromagnetic layer is fixed by a first antiferromagnetic layer provided to be contacted with the first ferromagnetic layer opposite to the nonmagnetic conductive layer or the nonmagnetic tunneling barrier layer; a magnetic flux guide for guiding an external magnetic field to the second ferromagnetic layer; and a pair of electrodes for flowing a sense current to the magnetoresistive film, includes: a second antiferromagnetic layer arranged so as to provide unidirectional magnetic anisotropy to the second ferromagnetic layer; a third antiferromagnetic layer arranged so as to provide unidirectional magnetic anisotropy to the magnetic flux guide; and a hard magnetic film arranged so as to apply a magnetic field to the second ferromagnetic layer and the magnetic flux guide.

A second antiferromagnetic layer is formed to be contacted with the second ferromagnetic layer opposite to the nonmagnetic conductive layer or the nonmagnetic tunneling barrier layer, a third antiferromagnetic layer is formed to be contacted with the magnetic flux guide, and a hard magnetic film is formed at each edge of the magnetoresistive film in the track width direction and at each edge of the magnetic flux guide in the track width direction.

The direction of unidirectional magnetic anisotropy provided to the second ferromagnetic layer by the second antiferromagnetic layer or the direction of unidirectional magnetic anisotropy provided to the magnetic flux guide by the third antiferromagnetic layer, and the direction of a magnetic field applied to the second ferromagnetic layer or the magnetic flux guide from the hard magnetic film are roughly matched.

The direction of unidirectional magnetic anisotropy provided to the first ferromagnetic layer by the first antiferromagnetic layer and the direction of unidirectional magnetic anisotropy provided to the second ferromagnetic layer by the second antiferromagnetic layer or the direction of unidirectional magnetic anisotropy provided to the magnetic flux guide by the third antiferromagnetic layer are roughly orthogonal, and when temperatures at which unidirectional magnetic anisotropy disappears (blocking temperatures) in the first antiferromagnetic layer, the second antiferromagnetic layer and the third antiferromagnetic layer are $T_{B1}$, $T_{B2}$ and $T_{B3}$, $TB_{B1} > T_{B2} = T_{B3}$.

When a saturation flux density of the second ferromagnetic layer is $B_{S2}$, its film thickness is $t_2$, a remaining flux density of the hard magnetic film is $Br_h$, and its film thickness is $t_h$, a longitudinal biasing ratio defined by $Br_h \cdot t_h / B_{S2} \cdot t_2$ is below 4.

A nonmagnetic layer is interposed between the second ferromagnetic layer and the second antiferromagnetic layer.

The first antiferromagnetic layer is made of an ordered alloy antiferromagnetic film expressed by Mn–$M_1$ in which $M_1$ is composed of at least one or more elements of Ni, Ru, Rh, Pd, Ir and Pt, and the second antiferromagnetic layer is made of a disordered alloy antiferromagnetic film expressed by Mn–$M_2$ in which $M_2$ is composed of at least one or more elements of Cr, Fe, Ru, Rh, Pd, Ir and Pt.

Further, in the present invention, a method for fabricating a magnetoresistive head including depositing a first and a second ferromagnetic layers via a nonmagnetic conductive layer or a nonmagnetic tunneling barrier layer; providing a first antiferromagnetic layer opposite to the nonmagnetic conductive layer or the nonmagnetic tunneling barrier layer to form a magnetoresistive film; forming a pair of electrodes for flowing a sense current to the magnetoresistive film; arranging a second antiferromagnetic layer so as to provide unidirectional magnetic anisotropy to the second ferromagnetic layer; arranging a hard magnetic film so as to apply a magnetic field to the second ferromagnetic layer; arranging a magnetic flux guide for guiding an external magnetic field to the second antiferromagnetic layer; and arranging a third antiferromagnetic layer so as to provide unidirectional magnetic anisotropy to the magnetic flux guide, includes a process for finally deciding by the direction of a magnetic field applied at annealing the direction of unidirectional magnetic anisotropy provided to the first ferromagnetic layer by the first antiferromagnetic layer and the direction of unidirectional magnetic anisotropy provided to the second ferromagnetic layer or the magnetic flux guide by the second antiferromagnetic layer, wherein the process subjects the first antiferromagnetic layer, the second antiferromagnetic layer or the third antiferromagnetic layer to annealing in the magnetic field under conditions of a temperature set from high to low in order of decreasing blocking temperature so as to provide the unidirectional magnetic anisotropy.

DETAILED DESCRIPTION OF THE PREFERRED EMBODIMENTS

Embodiments of the present invention will be described in detail hereinbelow with reference to the drawings.

Figure 1:
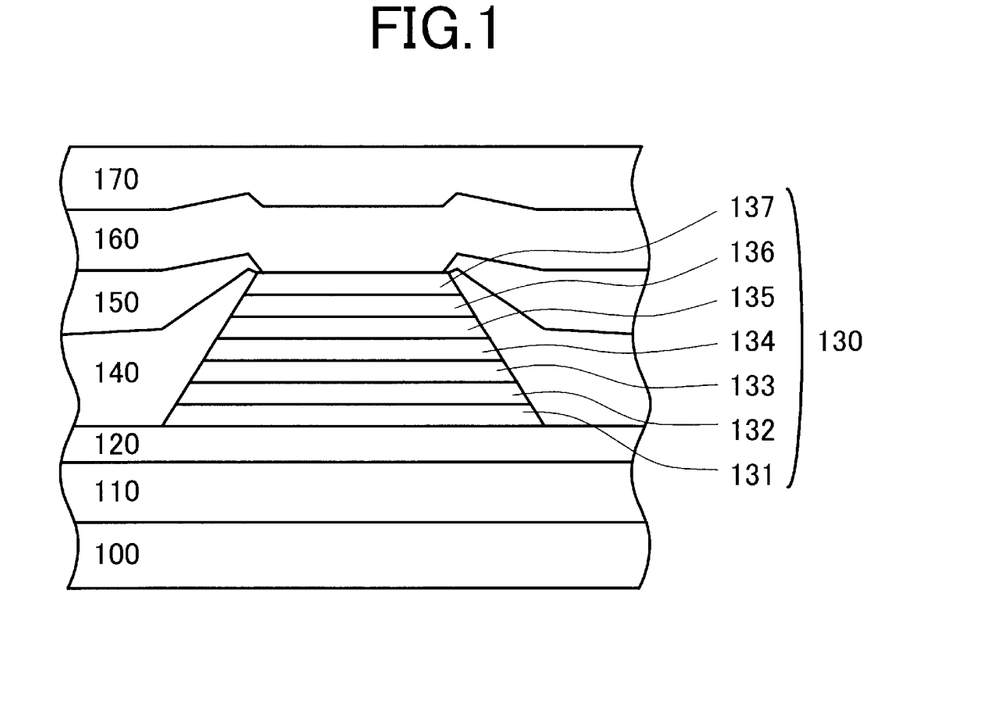
FIG. 1 is a schematic sectional view of a first embodiment of a magnetoresistive head of the present invention.

FIG. 1 shows a cross-sectional view of a magnetoresistive head of a first embodiment of the present invention. An overview of a head fabricating procedure will be described hereinbelow. After forming a lower shield 110 and a lower gap 120 on a substrate 100, a magnetoresistive film 130 is deposited and is patterned into a desired shape using photolithography and ion milling. A hard magnetic film 140 and an electrode 150 are formed at each edge of the magnetoresistive film 130 using a lift-off method. An upper gap 160 and an upper shield 170 are formed. The detailed film structure of the magnetoresistive film 130 includes underlayer 131/first antiferromagnetic layer 132/first ferromagnetic layer 133/nonmagnetic conductive layer 134/second ferromagnetic layer 135/second antiferromagnetic layer 136/protective layer 137. The first ferromagnetic layer 133 corresponds to the so-called fixing layer and the second ferromagnetic layer 135 corresponds to the so-called free layer. The first antiferromagnetic layer 132 is used for fixing the magnetization direction of the first ferromagnetic layer 133 (fixing layer) in one direction. The second antiferromagnetic layer 136 only applies a relatively small longitudinal biasing field to the second ferromagnetic layer 135 (free layer). The magnetization direction of the second ferromagnetic layer 135 is easily rotated by an external magnetic field. The relative angles of the first ferromagnetic layer 133 and the second ferromagnetic layer 135 are different by the signal field from a magnetic recording medium. The electric resistance of the magnetoresistive film 130 is changed corresponding to this so as to obtain an electromagnetically-converted normalized signal output. The longitudinal biasing field applied to the second ferromagnetic layer 135 (free layer) by the second antiferromagnetic layer 136 is set to a suitable value. By this setting, both sufficient inhibition of Barkhausen noise and high reading sensitivity can be provided. Arrangement of the hard magnetic film 140 can prevent a magnetic pole from being caused at the edge of the ferromagnetic free layer to reinforce the effect for inhibiting Barkhausen noise. The magnitude of a magnetostatic field given from the hard magnetic film 140 does not function to the center region of the second ferromagnetic layer 135 (free layer) and remains to the degree of forming a suitable insensitive zone at the edge of the second ferromagnetic layer 135 (free layer) so as to reduce an effective reading track width without deteriorating the reading sensitivity. Here is shown an example of the magnetoresistive film 130 to deposite the first ferromagnetic layer 133 on the side closer to the substrate 100. The deposition order may be reversed and be underlayer 131/second antiferromagnetic layer 136/second ferromagnetic layer 135/nonmagnetic conductive layer 134/first ferromagnetic layer 133/first antiferromagnetic layer 132/protective layer 137. The first ferromagnetic layer 133 and the second ferromagnetic layer 135 as components of the magnetoresistive film 130 may be of a single-layer film of NiFe or CoFe, a ferromagnetic multi-layer film of CoFe/NiFe, or the so-called synthetic ferri structure of CoFe/Ru/CoFe. The CIP-GMR head is described here. The structures of CPP-GMR and TMR heads will be described hereinbelow.

Figure 2:
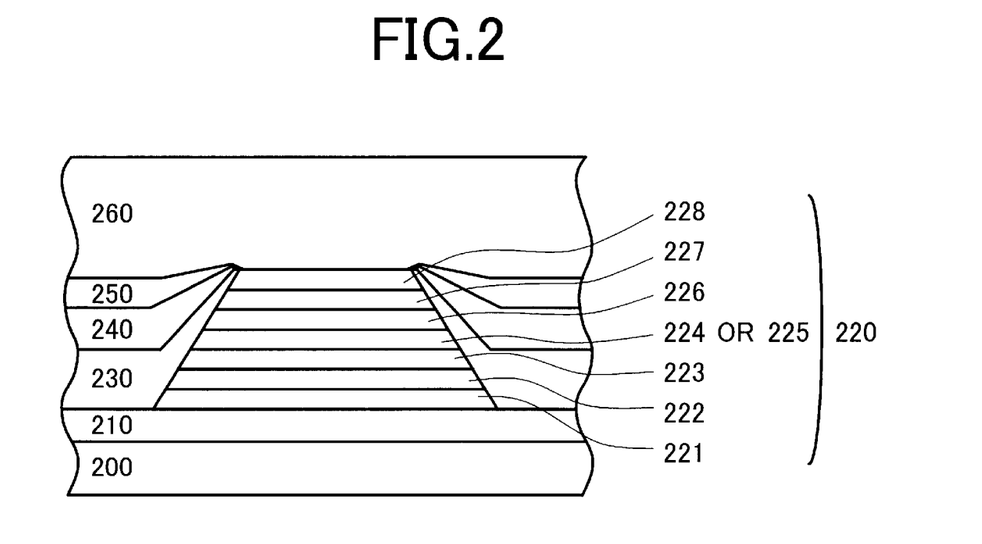
FIG. 2 is a schematic sectional view of a second embodiment of a magnetoresistive head of the present invention.

FIG. 2 shows a cross-sectional view of a magnetoresistive head of a second embodiment of the present invention. An overview of a head fabricating procedure will be described hereinbelow. After forming a lower electrode 210 serving as a lower shield on a substrate 200, a magnetoresistive film 220 is deposited and is patterned into a desired shape using photolithography and ion milling. A structure of first protective insulating film 230/hard magnetic film 240/second protective insulating film 250 is formed at each edge of the magnetoresistive film 220 using a lift-off method. An upper electrode 260 serving as an upper shield is formed. The detailed film structure of the magnetoresistive film 220 includes: (1) in a GMR head, underlayer 221/first antiferromagnetic layer 222/first ferromagnetic layer 223/nonmagnetic conductive layer 224/second ferromagnetic layer 226/second antiferromagnetic layer 227/protective layer 228; and (2) in a TMR head, underlayer 221/first antiferromagnetic layer 222/first ferromagnetic layer 223/tunneling barrier layer 225/second ferromagnetic layer 226/second antiferromagnetic layer 227/protective layer 228. The first ferromagnetic layer 223 corresponds to the so-called fixing layer and the second ferromagnetic layer 226 corresponds to the so-called free layer. The first antiferromagnetic layer 222 is used for fixing the magnetization direction of the first ferromagnetic layer 223 (fixing layer) in one direction. The second antiferromagnetic layer 227 only applies a relatively small longitudinal biasing field to the second ferromagnetic layer 226 (free layer). The magnetization direction of the second ferromagnetic layer 226 is easily rotated by an external magnetic field. The relative angles of the first ferromagnetic layer 223 and the second ferromagnetic layer 226 are different by the signal field from a magnetic recording medium. The electric resistance of the magnetoresistive film 220 is changed corresponding to this so as to obtain an electromagnetically-converted normalized signal output. The longitudinal biasing field applied to the second ferromagnetic layer 226 (free layer) by the second antiferromagnetic layer 227 is set to a suitable value. By this setting, both sufficient inhibition of Barkhausen noise and high reading sensitivity can be provided. Arrangement of the hard magnetic film 240 can prevent a magnetic pole from being caused at the edge of the ferromagnetic free layer to reinforce the effect for inhibiting Barkhausen noise. The magnitude of the magnetostatic field given from the hard magnetic film 240 does not function to the center region of the second ferromagnetic layer 226 (free layer) and remains to the degree of forming a suitable insensitive zone at the edge of the second ferromagnetic layer 226 (free layer) so as to reduce an effective reading track width without deteriorating the reading sensitivity.

The upper and lower sides of the hard magnetic film 240 are coated with the first protective insulating film 230 and the second protective insulating film 250. This is because the lower electrode 210 serving as the lower shield and the upper electrode 260 as the upper shield are prevented from being short-circuited. The second protective insulating film 250 may not be formed. Like substrate/lower shield/lower gap/lower electrode/magnetoresistive film, the lower shield and the lower electrode may be separately formed, which is the same for the upper shield and the upper electrode. Here is shown an example of the magnetoresistive film 220 to laminate the first ferromagnetic layer 223 on the side closer to the substrate 200. The lamination order may be reversed and be underlayer 221/second antiferromagnetic layer 227/second ferromagnetic layer 226/nonmagnetic conductive layer 224/first ferromagnetic layer 223/first antiferromagnetic layer 222/protective layer 228, or underlayer 221/second antiferromagnetic layer 227/second ferromagnetic layer 226/tunneling barrier layer 225/first ferromagnetic layer 223/first antiferromagnetic layer 222/protective layer 228. The first ferromagnetic layer 223 and the second ferromagnetic layer 225 as components of the magnetoresistive film 220 may be of a single-layer film of NiFe or CoFe and a ferromagnetic multi-layer film of CoFe/NiFe, or of the so-called synthetic ferri structure of CoFe/Ru/CoFe.

Figure 3A:
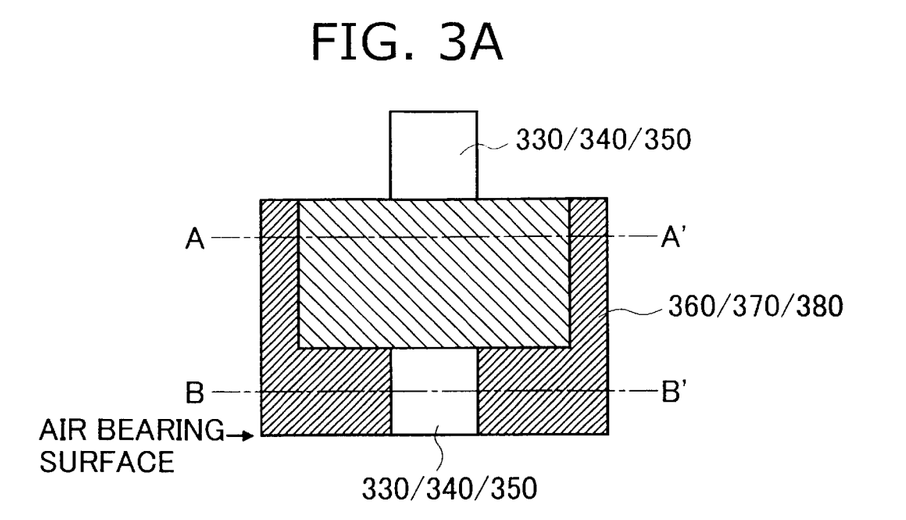
FIG. 3A shows a schematic plan third embodiment of a magnetoresistive head of the present invention.
Figure 3B:
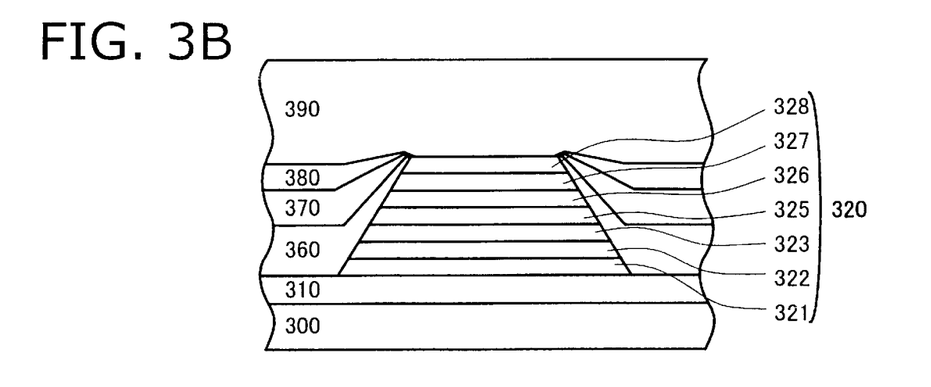
FIG. 3B shows a cross sectional view taken along line A–A' of FIG. 3A.
Figure 3C:
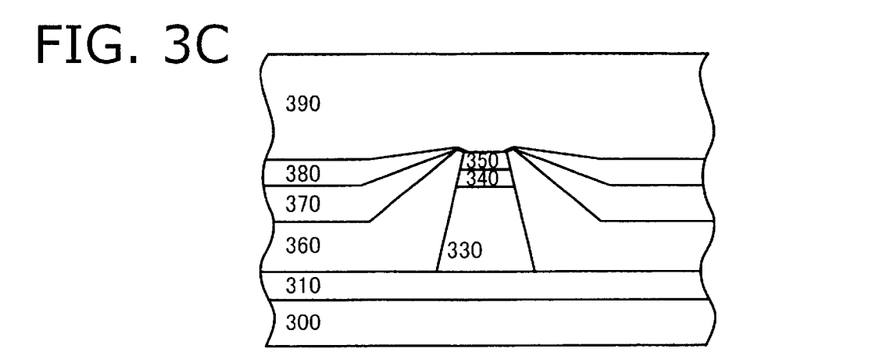
FIG. 3C shows a cross sectional view taken along line B–B' of FIG. 3A.

In a magnetoresistive head using a magnetic flux guide not exposing a magnetoresistive film from an ABS (air bearing surface), longitudinal biasing of the magnetic flux guide is required separately. FIG. 3 shows a plan view and a cross-sectional view viewed from the upper side of the substrate surface of the magnetoresistive head according to a third embodiment of the present invention. Here is shown the case of employing a TMR film as the magnetoresistive film. An overview of a head fabricating procedure will be described hereinbelow. After forming a lower electrode 310 serving as a lower shield on a substrate 300, a magnetoresistive film 320 is deposited and is patterned into a desired shape using photolithography and ion milling. A structure of third protective insulating film 330/magnetic flux guide 340/third antiferromagnetic layer 350 is formed and is patterned likewise.

A structure of first protective insulating film 360/hard magnetic film 370/second protective insulating film 380 is formed at each edge of the magnetoresistive film 320 and the structure of third protective insulating film 330/magnetic flux guide 340/third antiferromagnetic layer 350 using a lift-off method. An upper electrode 390 serving as an upper shield is formed. The detailed film structure of the magnetoresistive film 320 is similar to the structure shown in FIG. 2 and includes underlayer 321/first antiferromagnetic layer 322/first ferromagnetic layer 323/tunneling barrier layer 325/second ferromagnetic layer 326/second antiferromagnetic layer 327/protective layer 328. The third antiferromagnetic layer 350 only applies a relatively small longitudinal field to the magnetic flux guide 340. The magnetization direction of the magnetic flux guide 340 is easily rotated by an external magnetic field. In the head structure, the magnetic flux guide 340 is exposed from the ABS. The magnetization of the magnetic flux guide 340 is rotated by the signal field from a magnetic recording medium. The relative angles of the first ferromagnetic layer 323 and the second ferromagnetic layer 326 are different corresponding to this. The electric resistance of the magnetoresistive film 320 is changed corresponding to this so as to obtain an electromagnetically-converted normalized signal output. The reason why the third protective insulating film 330 is formed is that the heights of the magnetic flux guide 340 and the second ferromagnetic layer 326 (free layer) are matched.

Although not shown here, a protective layer may be formed on the third antiferromagnetic layer 350 as needed. Important is that the first ferromagnetic layer 323 (fixing layer) and the second ferromagnetic layer 326 (free layer) are prevented from being short-circuited by the magnetic flux guide 340 or the third antiferromagnetic layer 350. As described in the structure of FIG. 2, the second protective insulating film 380 may not be formed. Like substrate/lower shield/lower gap/lower electrode/magnetoresistive film, the lower shield and the lower electrode may be separately formed, which is the same for the upper shield and the upper electrode. Here is shown an example of the magnetoresistive film 320 to doposit the first ferromagnetic layer 323 on the side closer to the substrate 300. The deposition order may be reversed and be underlayer 321/second antiferromagnetic layer 327/second ferromagnetic layer 326/tunneling barrier layer 325/first ferromagnetic layer 323/first antiferromagnetic layer 322/protective layer 328.

In this case, the third protective insulating film 330/magnetic flux guide 340/the third antiferromagnetic layer 350 need not be formed in a process separately from the magnetoresistive film 320. The second antiferromagnetic layer 327 may serve as the third antiferromagnetic layer 350 and the second ferromagnetic layer 326 may serve as the magnetic flux guide 340. This can be realized by dividing the patterning process of the magnetoresistive film 320 into two processes of processing to the underlayer 321 as the lowest surface and processing to the tunneling barrier layer 325. The first ferromagnetic layer 323 and the second ferromagnetic layer 325 as components of the magnetoresistive film 320 may be a single-layer film of NiFe or CoFe, a ferromagnetic multi-layer film of CoFe/NiFe, or the so-called synthetic ferri structure of CoFe/Ru/CoFe. The magnetoresistive head using a magnetic flux guide employing a TMR film as the magnetoresistive film is described above, which is the same for CIP-GMR and CPP-GMR, and the description thereof is omitted.

The respective components of the magnetoresistive head shown in FIGS. 1 to 3 will be described in detail.

Since the substrate, shield, gap, hard magnetic film, and electrode need not be particularly limited in the present invention, materials typically used are described by way of example. Desirable are a substrate of AlTiC, SiC or $Al_2O_3$ coated thereon; a shield of a single-layer or a multi-layer film of an NiFe alloy and a nitride thereof, or a CoZr, CoHf or CoTa amorphous alloy; a gap of $Al_2O_3$, AlN, $SiO_2$ and a mixture thereof; a hard magnetic film of a CoPt alloy or Pt or ZrO2 added thereto; and an electrode of Cr, α-Ta or Au.

It is desirable to use a magnetic flux guide of a material having a high permeability made of a single-layer or a multi-layer film of an NiFe alloy and a nitride thereof, or a CoZr, CoHf or CoTa amorphous alloy.

One example of the film structure of the magnetoresistive film will be shown below. The value in ( ) indicates a film thickness and the unit is nm. As a GMR film,
Ta(1)/NiFe(2)/MnPt(12)/CoFe(1.5)/Ru(0.8)/CoFe(2)/Cu(2.1)/CoFe(1)/NiFe(2)/MnIr(8)/Ta(1) are preferable. As a TMR film,
Ta(1)/NiFe(2)/MnPt(12)/CoFe(1.5)/Ru(0.8)/CoFe(2)/Al(0.5)oxidation/CoFe(1)/NiFe(2)/MnIr(8)/Ta(1) are preferable. From the viewpoint of controllability and mass production efficiency, these are preferably fabricated by a sputtering method. For the ferromagnetic layer, a material composed mainly of Fe, Co and Ni having a high spin polarizability in Fermi energy is used so as to increase the resistive change rate of the magnetoresistive film acting largely on normalized signal output. The composition and film thickness are desirably adjusted as needed to ensure, in addition to the resistive change rate, small magnetostriction, low coercivity, a large coupling magnetic field provided from the antiferromagnetic layer, and symmetry of the reading waveform. For a nonmagnetic conductive layer in the GMR film, in addition to Cu, Ag and Au may be used. The tunneling barrier layer in the TMR film is formed using the so-called natural oxidation method which introduces oxygen into a chamber after depositing the Al film. Al, Si, Ta or Mg may be deposited to form an oxide and a nitride, or $Al_2O_3$, AlN, $SiO_2$, SiN, $Ta_2O_5$ or MgO may be directly deposited.

An ordered alloy MnPt film is used as the first antiferromagnetic layer which fixes the magnetization direction of the first ferromagnetic layer (fixing layer) in one direction. An ordered antiferromagnetic film expressed by $Mn-M_1$ may be also used. $M_1$ is composed of an element including at least one or more Ni, Ru, Rh, Pd, Ir, and Pt. A disordered MnIr film is used as the second antiferromagnetic layer which applies a relatively small longitudinal biasing field to the second ferromagnetic layer (free layer). Another candidate is made of a material made of a disordered alloy antiferromagnetic film expressed by $Mn-M_2$ and a material of $M_2$ composed of at least one or more elements of Cr, Fe, Ru, Rh, Pd, Ir and Pt may be used.

To obtain good reading characteristic, in a state that an external magnetic field is not applied, the magnetization direction of the first ferromagnetic layer (fixing layer) must be directed in the perpendicular direction (hereinafter, referred to as the element height direction) to the ABS and the magnetization direction of the second ferromagnetic layer (free layer) must be directed in the track direction of a magnetic recording medium. These can be realized by providing unidirectional magnetic anisotropy by exchange coupling to the first and second antiferromagnetic layers. The detailed description to realize this will be done based on the following experimental results.

Figure 4:
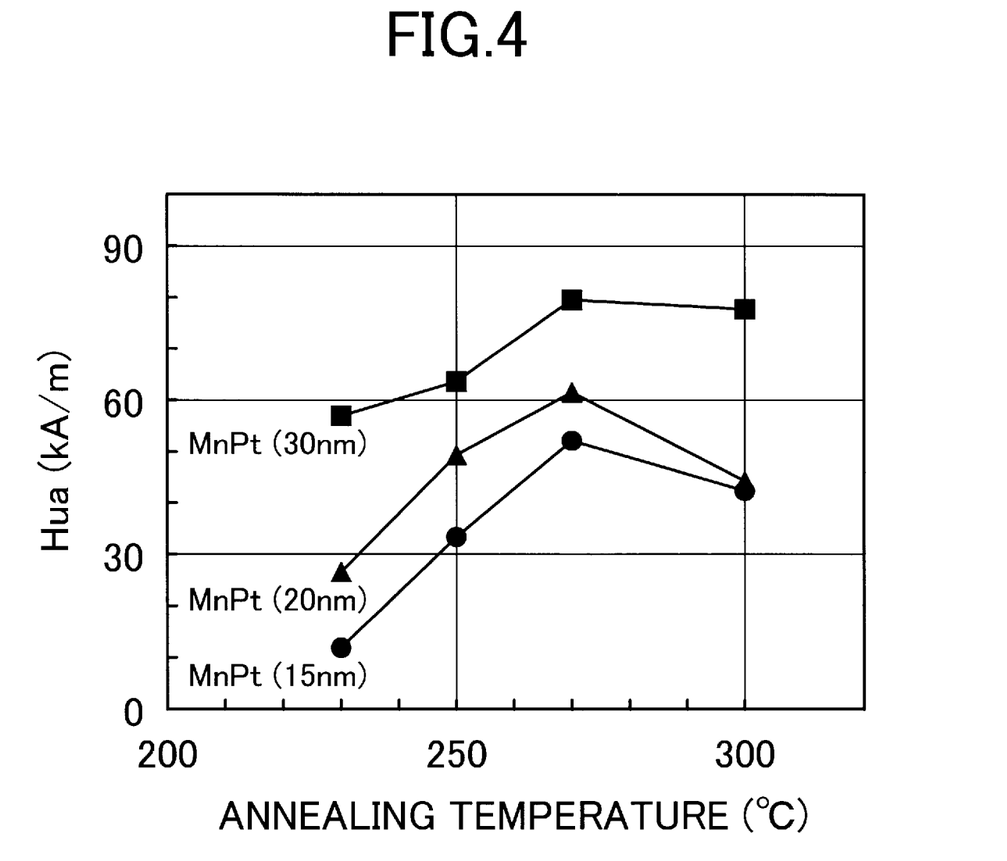
FIG. 4 is a diagram showing annealing temperature dependence of an exchange coupling field provided by a MnPt film.

FIG. 4 shows annealing temperature dependence of an exchange coupling field $H_{ua}$ in a structure including glass substrate/Ta(5)/$Mn_{48}Pt_{52}$(15, 20, 30)/$Co_{90}Fe_{10}$(2)/Cu (2.1)/$Co_{90}Fe_{10}$(1)/$Ni_{85}Fe_{15}$(3)/Ta (3) (film thickness unit: nm). Annealing is conducted in a vacuum below $1\times10^{-3}$ Pa while applying a magnetic field of 240 kA/m in one direction and holding time is three hours. Although not shown in the drawing, $H_{ua}$ is not exhibited immediately after deposition. Immediately after deposition, the MnPt film is not of an ordered CuAuI type structure showing antiferromagnetism, but is of a disordered fcc structure. This is understood to show paramagnetism. To obtain a sufficiently large $H_{ua}$ in applying the magnetic head, annealing at 230 to 270° C. is needed. As the annealing temperature is higher, the $H_{ua}$ is increased. When the annealing temperature is raised above 300° C., the resistive change rate is lowered and the interlayer coupling field functioning between the free layer and the fixing layer is increased. It is not preferable.

Figure 5:
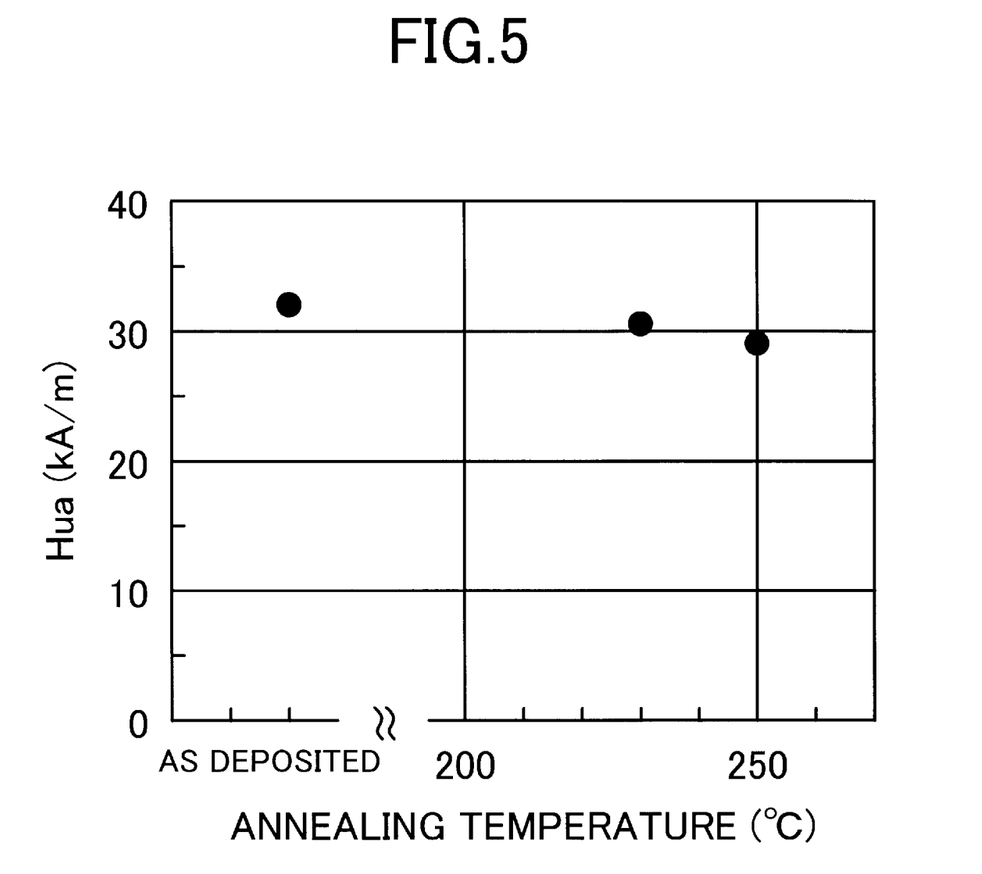
FIG. 5 is a diagram showing annealing temperature dependence of an exchange coupling field provided by a MnIr film.

FIG. 5 shows annealing temperature dependence of an exchange coupling field $H_{ua}$ in a structure including glass substrate/Ta(5)/Ni$_{81}$Fe$_{19}$ (5)/Co$_{90}$Fe$_{10}$(1)/Cu (2.5)/Co$_{90}$Fe$_{10}$ (3)/Mn$_{78}$Ir$_{22}$ (8)/Ta (3) (film thickness unit: nm). Annealing is conducted in a vacuum below $1 \times 10^{-3}$ Pa while applying a magnetic field of 240 kA/m in one direction and holding time is three hours. When the disordered MnIr film is used for the antiferromagnetic layer, a large $H_{ua}$ is obtained immediately after deposition. The $H_{ua}$ after the annealing is not found to be largely lowered than as deposited.

Figure 6:
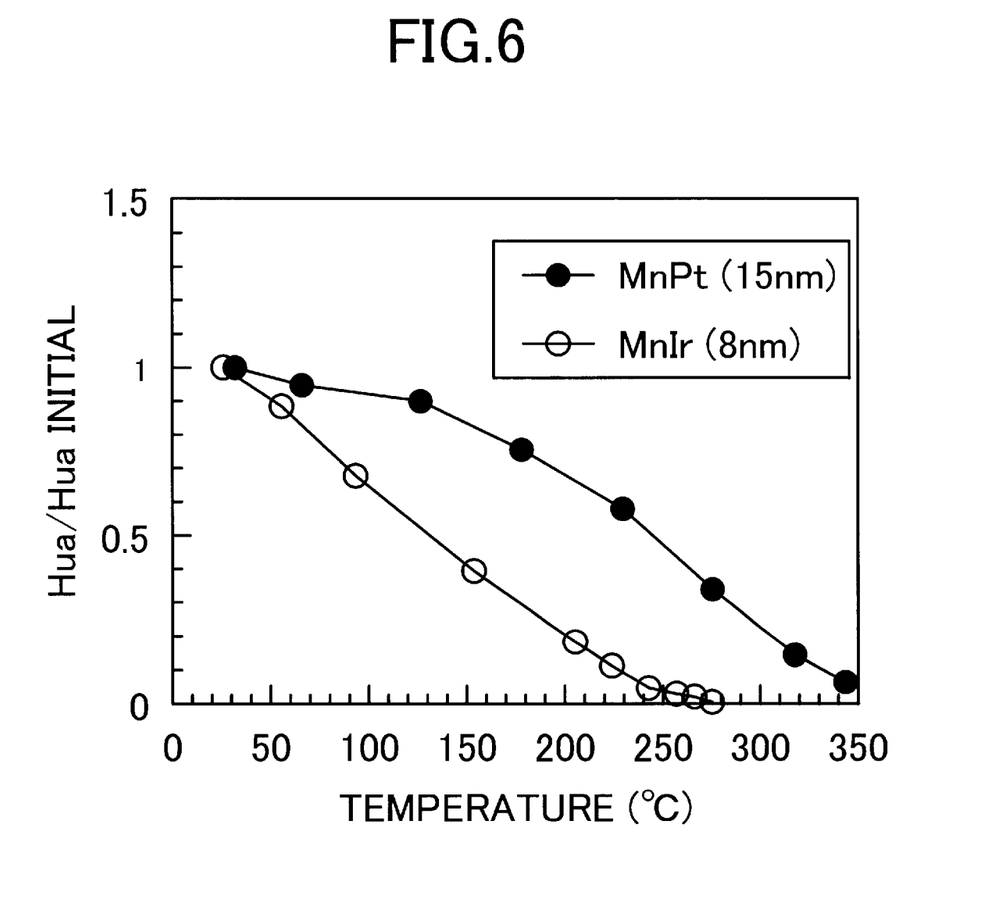
FIG. 6 is a diagram showing temperature dependence of an exchange coupling field provided by a MnPt film and an MnIr film.

FIG. 6 shows temperature dependence of unidirectional magnetic anisotropy provided by the MnPt film or MnIr film. The unidirectional magnetic anisotropy disappears at 350° C. for the MnPt film, and 250° C. for the MnIr film. Within the temperature range of 250 to 350° C., the unidirectional magnetic anisotropy is held only in the first ferromagnetic layer (fixing layer) exchange coupled to the MnPt film.

Using the following method, the magnetization direction of the first ferromagnetic layer (fixing layer) can be directed in the element height direction and the magnetization direction of the second ferromagnetic layer (free layer) can be directed in the track direction of the magnetic recording medium. The case of using the ordered MnPt film as the first antiferromagnetic layer and the disordered MnIr film as the second antiferromagnetic layer will be explained here by way of example. While applying a magnetic field large enough to saturate the magnetization direction of the first ferromagnetic layer (fixing layer) in the element height direction, annealing is conducted at temperatures of about 230 to 270° C. for several hours. This orders the MnPt film which is in a disordered phase immediately after deposition into a CuAuI structure and provides unidirectional magnetic anisotropy in the element height direction to the first ferromagnetic layer (fixing layer). In this case, the disordered MnIr film roughly directs, in the element height direction, the direction of unidirectional magnetic anisotropy provided to the second ferromagnetic layer (free layer).

In a second annealing process, without changing the direction of the unidirectional magnetic anisotropy provided to the first ferromagnetic layer (fixing layer), the direction of the unidirectional magnetic anisotropy provided to the second ferromagnetic layer (free layer) must be directed in the track direction of the magnetic recording medium. Specifically, while applying a magnetic field large enough to saturate the magnetization direction of the second ferromagnetic layer (free layer), annealing is conducted at a temperature of about 250° C. In this case, annealing time is sufficiently a short time below one hour. A difference in the blocking temperature is used to adjust the annealing temperature and time so that without changing the direction of the unidirectional magnetic anisotropy provided to the first ferromagnetic layer (fixing layer), the direction of the unidirectional magnetic anisotropy provided to the second ferromagnetic layer (free layer) can be directed in the track direction of the magnetic recording medium. The magnetic anisotropy control of the second ferromagnetic layer (free layer) is described here. The similar method for the magnetic flux guide made of a soft magnetic film of NiFe can be used to control the magnetic anisotropy.

The direction of the unidirectional magnetic anisotropy provided to the second ferromagnetic layer or the magnetic flux guide by the exchange coupling to the second antiferromagnetic layer and the magnetostatic field applied to the second ferromagnetic layer or the magnetic flux guide from the hard magnetic film must be roughly matched. When these directions are matched, the magnetic energy is smallest and is stable and reading characteristic having high reliability can be obtained.

Figure 7:
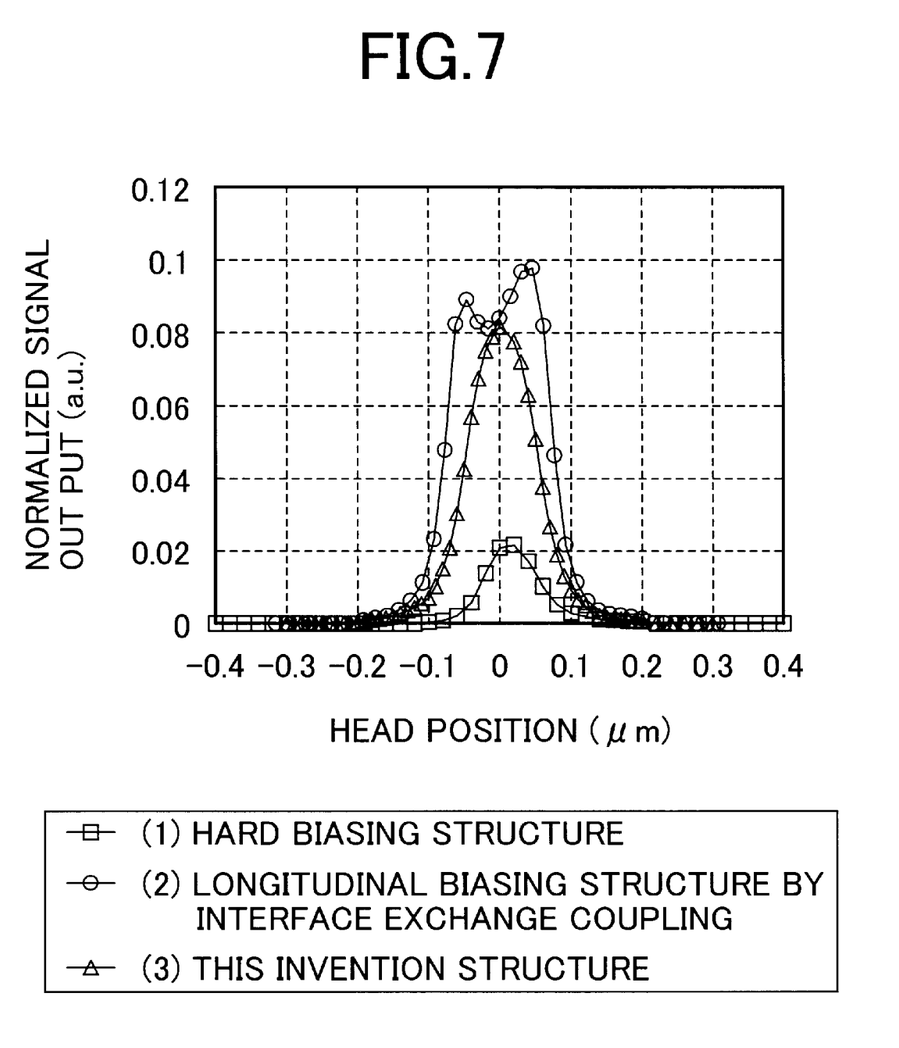
FIG. 7 is a diagram showing micro track characteristic of a prior art magnetoresistive head structure.

FIG. 7 shows simulation results of the micro track characteristic of head output in the case of using the prior art and the case of applying the present invention. A geometrical track width is 0.10 μm. There are compared (1) the prior art hard biasing structure: longitudinal biasing ratio of 5, (2) the prior art longitudinal biasing structure by interface exchange coupling: exchange coupling field of 24 kA/m, and (3) this invention structure: longitudinal biasing ratio of 2+ exchange coupling field of 8 kA/m. In the prior art hard biasing structure of (1), the normalized signal output is very small. In other words, the influence of the insensitive zone formed by the hard magnetic film arranged at the edge of the element is large so that the reading sensitivity is lowered over the track width. The prior art longitudinal biasing structure by interface exchange coupling of (2) can obtain the largest normalized signal output. The effective reading track width defined by the half-value width of the shown micro track profile is wide, which is not suitable for track width reduction. It is also found that the output is minimum near the head position: 0 μm. This suggests that the magnetization at the edge of the second ferromagnetic layer (free layer) is unstable. The sufficient longitudinal biasing effect cannot be expected. On the other hand, in this invention structure of (3), normalized signal output equal to that of the prior art longitudinal biasing structure by interface exchange coupling of (2) can be obtained, and an effective reading track width is not found to be increased. Further, the unstable behavior of the magnetization at the edge of the element as seen in the prior art longitudinal biasing structure by interface exchange coupling of (2) is not found. This invention structure can satisfy all of high reading sensitivity, reduction of reading track width, and sufficient inhibition of Barkhausen noise.

Figure 8:
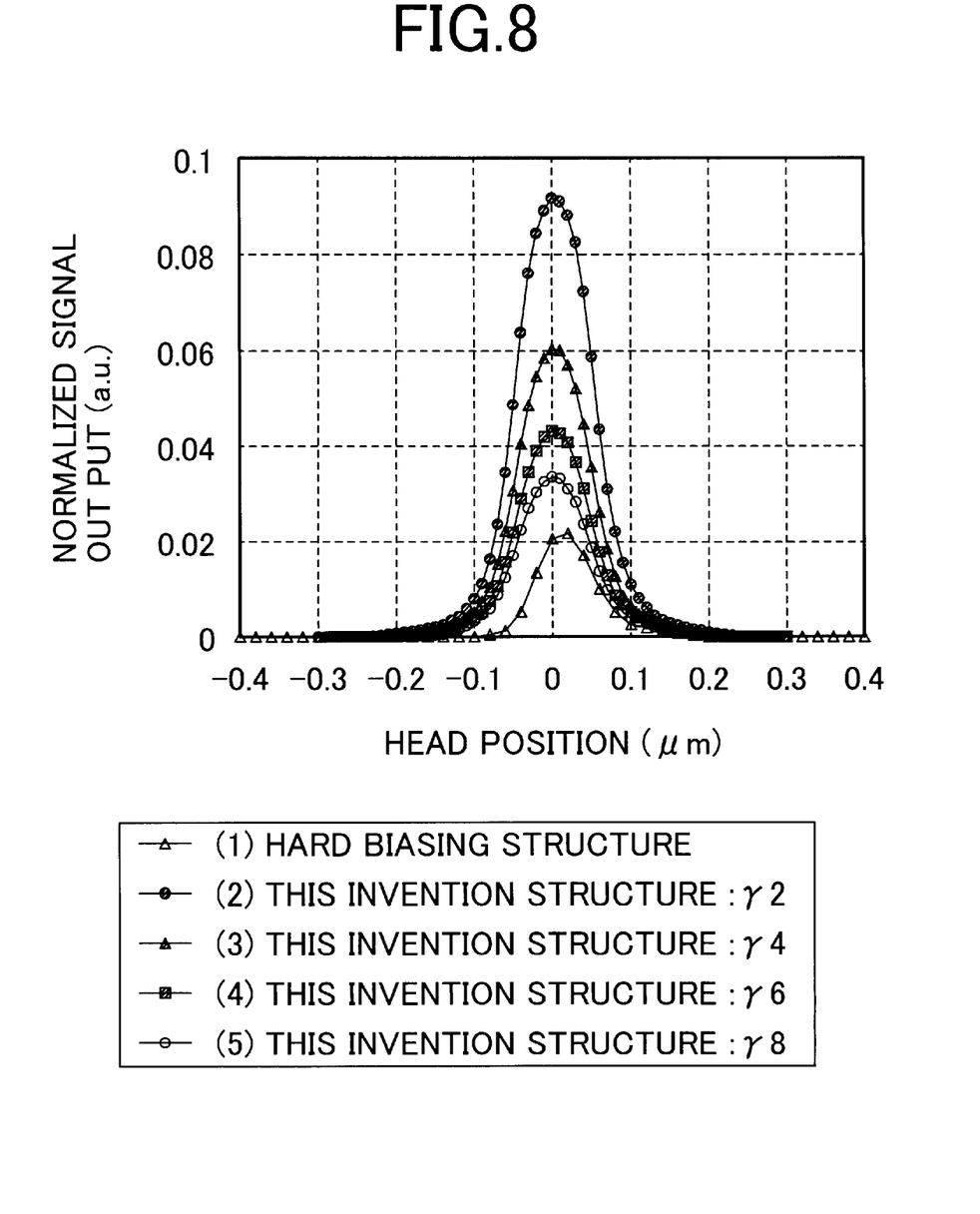
FIG. 8 is a diagram showing micro track characteristic of a magnetoresistive head structure of the present invention.

FIG. 8 shows simulation results of the micro track characteristic of head output in this invention structure when the exchange coupling field given by the antiferromagnetic layer is 4 kA/m and the magnetostatic field (the parameter is the longitudinal biasing ratio) provided by the hard magnetic film is changed. For comparison, the results of the prior art hard biasing structure having a longitudinal biasing ratio of 5 are also shown. A geometrical track width for these is 0.10 μm. In this invention structure, it is found that as the longitudinal biasing ratio is increased, the normalized signal output is decreased. In other words, this shows with increase of the longitudinal biasing ratio, the influence of the insensitive zone is larger and the reading sensitivity is decreased. In this invention structure, when the longitudinal biasing ratio is larger than 4, large output increase cannot be expected as compared with the prior art hard biasing structure. The longitudinal biasing ratio is desirably below 4.

Figure 9:
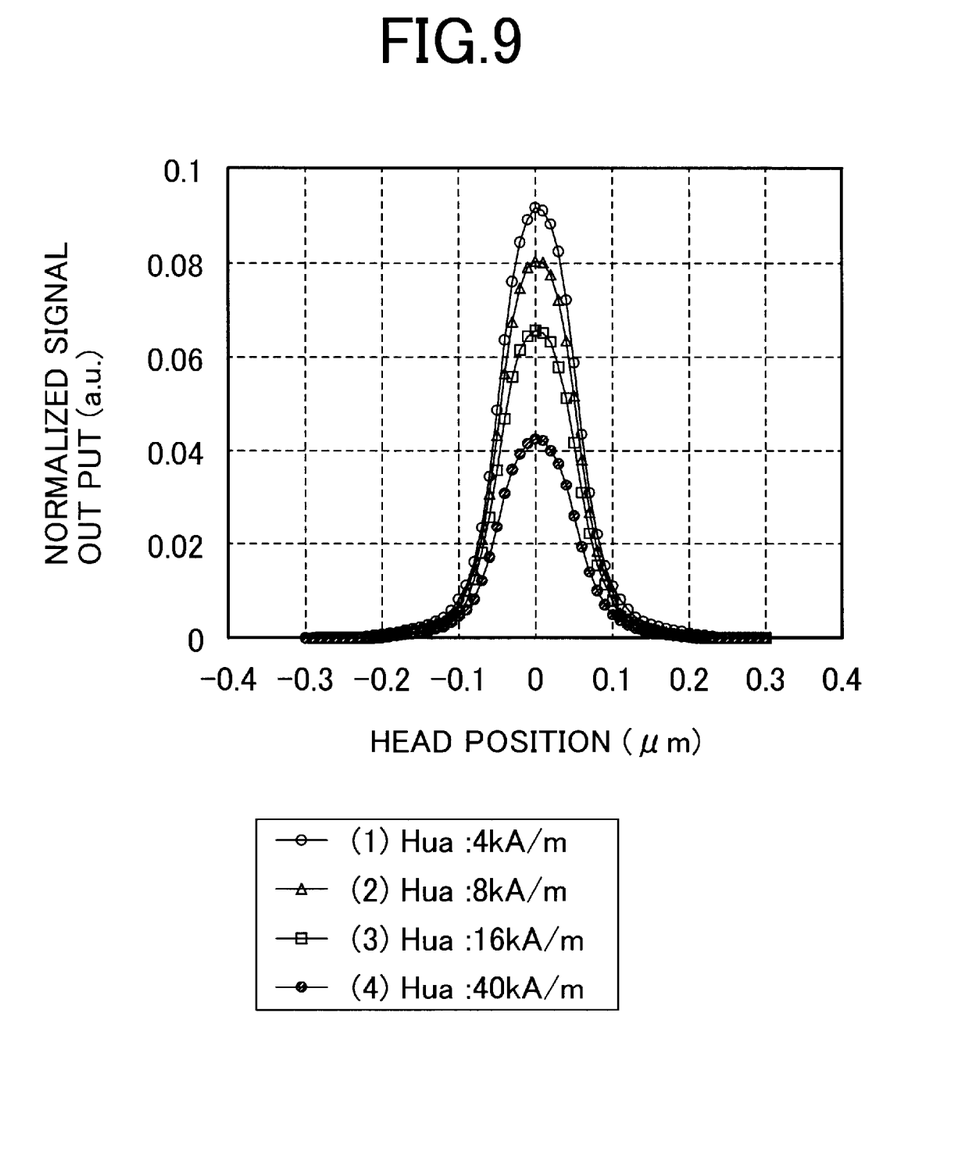
FIG. 9 is a diagram showing micro track characteristic of a magnetoresistive head structure of the present invention.

The exchange coupling field provided to the second ferromagnetic layer (free layer) by the antiferromagnetic layer largely changes the normalized signal output and the longitudinal biasing effect. FIG. 9 shows simulation results of the micro track characteristic of head output in this invention structure when the magnitude of the magnetostatic field provided by the hard magnetic film is fixed (the longitudinal biasing ratio: 2) and the exchange coupling field provided by the antiferromagnetic layer is changed. A geometrical track width for these is 0.10 μm. In this invention structure, it is found that as the longitudinal biasing field is increased, the normalized signal output is decreased. On the other hand, when the magnitude of the exchange coupling field is reduced to 4 kA/m, the unstable behavior of the magnetization of the second ferromagnetic layer (free layer) as seen in the longitudinal biasing structure by interface exchange coupling of (2) of FIG. 7 is not found. To realize high reading sensitivity, the exchange coupling field must be adjusted so as not to be too large. Since the magnetic field is roughly inversely proportion to the film thickness of the second ferromagnetic layer (free layer), its magnitude can be changed by the film thickness of the second ferromagnetic layer (free layer). When the film thickness is significantly large or small, it is not preferable since the resistive change rate is lowered and the soft magnetic characteristic is deteriorated.

As shown in FIG. 5, the exchange coupling field given from $Mn_{78}Ir_{22}$(8 nm) to $Co_{90}Fe_{10}$(3 nm) is about 30 kA/m. High reading sensitivity cannot be obtained. To adjust the exchange coupling field provided to the second ferromagnetic layer (free layer), using the following method is effective. A nonmagnetic layer for controlling the exchange coupling field is introduced between the second ferromagnetic layer (free layer) and the second antiferromagnetic layer. For the nonmagnetic layer, candidates of effective materials are Cr, Cu, Ru, Rh, Ag, Pd, Re, Ir, Pt and Au. In place of the nonmagnetic layer, a ferromagnetic layer of NiFe with a material such as Nb added thereto can obtain the same effect. In the case of using such a ferromagnetic layer, the magnetization amount of the second ferromagnetic layer (free layer) and a ferromagnetic layer introduced for controlling the exchange coupling field must not be too large.

An invention described in a further embodiment is a method for fabricating a magnetoresistive head including laminating a first and a second ferromagnetic layers via a nonmagnetic conductive layer or a nonmagnetic tunneling barrier layer; providing a first antiferromagnetic layer opposite to the nonmagnetic conductive layer or the nonmagnetic tunneling barrier layer to form a magnetoresistive film; forming a pair of electrodes for flowing a sense current to the magnetoresistive film; arranging a second antiferromagnetic layer so as to provide unidirectional magnetic anisotropy to the second ferromagnetic layer; arranging a hard magnetic film so as to apply a magnetic field to the second ferromagnetic layer; arranging a magnetic flux guide for guiding an external magnetic field to the second antiferromagnetic layer; and arranging a third antiferromagnetic layer so as to provide unidirectional magnetic anisotropy to the magnetic flux guide, including a process for finally deciding by the direction of a magnetic field applied at annealing the direction of unidirectional magnetic anisotropy provided to the first ferromagnetic layer by the first antiferromagnetic layer and the direction of unidirectional magnetic anisotropy provided to the second ferromagnetic layer or the magnetic flux guide by the second antiferromagnetic layer, wherein the process subjects the first antiferromagnetic layer, the second antiferromagnetic layer or the third antiferromagnetic layer to annealing in the magnetic field under conditions of a temperature set from high to low in order of decreasing blocking temperature so as to provide the unidirectional magnetic anisotropy.

The magnetoresistive head fabricated by the structure and fabricating method as described above exhibits good reading characteristic and can be mounted on a magnetic recording and reading device such as a magnetic disk unit and a magnetic tape device having a high surface recording density.

As described above, the present invention can obtain a magnetoresistive head which can provide both high reading sensitivity and low noise even when the track width is being reduced. In other words, it can provide a magnetoresistive head which can achieve a high surface recording density and is highly reliable without Barkhausen noise.

What is claimed is:

1. A magnetoresistive head having a first and a second ferromagnetic layer separated by a nonmagnetic conductive layer or a nonmagnetic tunneling barrier layer; a magnetoresistive film in which the magnetization direction of the first ferromagnetic layer is fixed by a first antiferromagnetic layer provided to be contacted with the first ferromagnetic layer opposite to said nonmagnetic conductive layer or said nonmagnetic tunneling barrier layer; and a pair of electrodes for flowing a sense current to the magnetoresistive film, wherein a second antiferromagnetic layer is formed to be contacted with said second ferromagnetic layer opposite to said nonmagnetic conductive layer or said nonmagnetic tunneling barrier layer, and a hard magnetic film is formed at each edge of said magnetoresistive film in the track width direction.

2. The magnetoresistive head according to claim 1, wherein when a saturation flux density of said second ferromagnetic layer is $B_{s2}$, its film thickness is $t_2$, a remaining flux density of said hard magnetic film is $Br_h$, and its film thickness is $t_h$, a longitudinal biasing ratio defined by $Br_h \cdot t_h / B_{s2} \cdot t_2$ is below 4.

3. The magnetoresistive head according to claim 1, wherein a nonmagnetic layer is interposed between said second ferromagnetic layer and said second antiferromagnetic layer.

4. The magnetoresistive head according to claim 1, wherein the direction of unidirectional magnetic anisotropy provided to said second ferromagnetic layer by said second antiferromagnetic layer or the direction of unidirectional magnetic anisotropy provided to said magnetic flux guide by said third antiferromagnetic layer, and the direction of a magnetic field applied to said second ferromagnetic layer or said magnetic flux guide from said hard magnetic film are roughly matched.

5. The magnetoresistive head according to claim 1, wherein the direction of unidirectional magnetic anisotropy provided to said first ferromagnetic layer by said first antiferromagnetic layer and the direction of unidirectional magnetic anisotropy provided to said second ferromagnetic layer by said second antiferromagnetic layer are roughly orthogonal, and when temperatures at which unidirectional magnetic anisotropy disappears (blocking temperatures) in said first antiferromagnetic layer, said second antiferromagnetic layer and said third antiferromagnetic layer are $T_{B1}$, $T_{B2}$ and $T_{B3}$, $T_{B1} > T_{B2} = T_{B3}$.

6. A magnetoresistive head having a first and a second ferromagnetic layer separated by a nonmagnetic conductive layer or a nonmagnetic tunneling barrier layer; a magnetoresistive film in which the magnetization direction of the first ferromagnetic layer is fixed by a first antiferromagnetic layer provided to be contacted with the first ferromagnetic layer opposite to said nonmagnetic conductive layer or said nonmagnetic tunneling barrier layer; a magnetic flux guide for guiding an external magnetic field to said second ferromagnetic layer; and a pair of electrodes for flowing a sense current to said magnetoresistive film, wherein a second antiferromagnetic layer is arranged so as to provide unidirectional magnetic anisotropy to said second ferromagnetic layer; a third antiferromagnetic layer is arranged so as to provide unidirectional magnetic anisotropy to said magnetic flux guide; and a hard magnetic film is arranged so as to apply a magnetic field to said second ferromagnetic layer and said magnetic flux guide.

7. The magnetoresistive head according to claim 6, wherein the direction of unidirectional magnetic anisotropy provided to said second ferromagnetic layer by said second antiferromagnetic layer or the direction of unidirectional magnetic anisotropy provided to said magnetic flux guide by said third antiferromagnetic layer, and the direction of a magnetic field applied to said second ferromagnetic layer or said magnetic flux guide from said hard magnetic film are roughly matched.

8. The magnetoresistive head according to claim 6, wherein the direction of unidirectional magnetic anisotropy provided to said first ferromagnetic layer by said first antiferromagnetic layer and the direction of unidirectional magnetic anisotropy provided to said second ferromagnetic layer by said second antiferromagnetic layer or the direction of unidirectional magnetic anisotropy provided to said magnetic flux guide by said third antiferromagnetic layer are roughly orthogonal, and when temperatures at which unidirectional magnetic anisotropy disappears (blocking temperatures) in said first antiferromagnetic layer, said second antiferromagnetic layer and said third antiferromagnetic layer are $T_{B1}$, $T_{B2}$ and $T_{B3}$, $T_{B1} > T_{B2} = T_{B3}$.

9. The magnetoresistive head according to claim 8, wherein said first antiferromagnetic layer is made of an ordered alloy antiferromagnetic film expressed by Mn–$M_1$ in which $M_1$ is composed of at least one or more elements of Ni, Ru, Rh, Pd, Ir and Pt, and said second antiferromagnetic layer is made of a disordered alloy antiferromagnetic film expressed by Mn–$M_2$ in which $M_2$ is composed of at least one or more elements of Cr, Fe, Ru, Rh, Pd, Ir and Pt.

10. A magnetoresistive head having a first and a second ferromagnetic layer separated by a nonmagnetic conductive layer or a nonmagnetic tunneling barrier layer; a magnetoresistive film in which the magnetization direction of the first ferromagnetic layer is fixed by a first antiferromagnetic layer provided to be contacted with the first ferromagnetic layer opposite to said nonmagnetic conductive layer or said nonmagnetic tunneling barrier layer; a magnetic flux guide for guiding an external magnetic field to said second ferromagnetic layer; and a pair of electrodes for flowing a sense current to said magnetoresistive film wherein a second antiferromagnetic layer is formed to be contacted with said second ferromagnetic layer opposite to said nonmagnetic conductive layer or said nonmagnetic tunneling barrier layer, a third antiferromagnetic layer is formed to be contacted with said magnetic flux guide, and the hard magnetic film is formed at each edge of said magnetoresistive film in the track width direction and at each edge of said magnetic flux guide in the track width direction.

11. The magnetoresistive head according to claim 10, wherein the direction of unidirectional magnetic anisotropy provided to said second ferromagnetic layer by said second antiferromagnetic layer or the direction of unidirectional magnetic anisotropy provided to said magnetic flux guide by said third antiferromagnetic layer, and the direction of a magnetic field applied to said second ferromagnetic layer or said magnetic flux guide from said hard magnetic film are roughly matched.

12. The magnetoresistive head according to claim 10, wherein the direction of unidirectional magnetic anisotropy provided to said first ferromagnetic layer by said first antiferromagnetic layer and the direction of unidirectional magnetic anisotropy provided to said second ferromagnetic layer by said second antiferromagnetic layer or the direction of unidirectional magnetic anisotropy provided to said magnetic flux guide by said third antiferromagnetic layer are roughly orthogonal, and when temperatures at which unidirectional magnetic anisotropy disappears (blocking temperatures) in said first antiferromagnetic layer, said second antiferromagnetic layer and said third antiferromagnetic layer are $T_{B1}$, $T_{B2}$ and $T_{B3}$, $T_{B1} > T_{B2} = T_{B3}$.

13. The magnetoresistive head according to claim 12, wherein said first antiferromagnetic layer is made of an ordered alloy antiferromagnetic film expressed by Mn–$M_1$ in which $M_1$ is composed of at least one or more elements of Ni, Ru, Rh, Pd, Ir and Pt, and said second antiferromagnetic layer is made of a disordered alloy antiferromagnetic film expressed by Mn–$M_2$ in which $M_2$ is composed of at least one or more elements of Cr, Fe, Ru, Rh, Pd, Ir and Pt.

14. A magnetoresistive head having a first and a second ferromagnetic layer separated by a nonmagnetic conductive layer or a nonmagnetic tunneling barrier layer; a magnetoresistive film in which the magnetization direction of the first ferromagnetic layer is fixed by a first antiferromagnetic layer provided to be contacted with the first ferromagnetic layer opposite to said nonmagnetic conductive layer or said nonmagnetic tunneling barrier layer; and a pair of electrodes for flowing a sense current to the magnetoresistive film, wherein a second antiferromagnetic layer is arranged so as to provide unidirectional magnetic anisotropy to said second ferromagnetic layer; and a hard magnetic film is arranged so as to apply a magnetic field to said second ferromagnetic layer, and wherein when a saturation flux density of said second ferromagnetic layer is $B_{S2}$, its film thickness is $t_2$, a remaining flux density of said hard magnetic film is $Br_h$, and its film thickness is $t_h$, and a longitudinal biasing ratio defined by $Br_h \cdot t_h / B_{S2} \cdot t_2$ is below 4.

15. The magnetoresistive head according to claim 14, wherein a nonmagnetic layer is interposed between said second ferromagnetic layer and said second antiferromagnetic layer.

16. The magnetoresistive head according to claim 14, wherein the direction of unidirectional magnetic anisotropy provided to said second ferromagnetic layer by said second antiferromagnetic layer or the direction of unidirectional magnetic anisotropy provided to said magnetic flux guide by said third antiferromagnetic layer, and the direction of a magnetic field applied to said second ferromagnetic layer or said magnetic flux guide from said hard magnetic film are roughly matched.

17. The magnetoresistive head according to claim 14, wherein the direction of unidirectional magnetic anisotropy provided to said first ferromagnetic layer by said first antiferromagnetic layer and the direction of unidirectional magnetic anisotropy provided to said second ferromagnetic layer by said second antiferromagnetic layer are roughly orthogonal, and when temperatures at which unidirectional magnetic anisotropy disappears (blocking temperatures) in said first antiferromagnetic layer, said second antiferromagnetic layer and said third antiferromagnetic layer are $T_{B1}$, $T_{B2}$ and $T_{B3}$, $T_{B1} > T_{B2} = T_{B3}$.

* * * * *